United States Patent [19]

Kaufmann

[11] Patent Number: 4,863,206
[45] Date of Patent: Sep. 5, 1989

[54] SUPPORT FOR A GRIPPER

[75] Inventor: Karl E. Kaufmann, Wetter, Fed. Rep. of Germany

[73] Assignee: Mannesmann Aktiengesellschaft, Düsseldorf, Fed. Rep. of Germany

[21] Appl. No.: 126,410

[22] Filed: Nov. 30, 1987

[30] Foreign Application Priority Data

Dec. 3, 1986 [DE] Fed. Rep. of Germany ....... 3641368

[51] Int. Cl.[4] ............................................. B25J 17/02
[52] U.S. Cl. ................................ 294/86.4; 294/119.4; 901/16; 901/28; 901/29
[58] Field of Search ...................... 294/86.4, 88, 119.4, 294/67.21, 82.12; 901/28, 29, 16, 17

[56] References Cited

U.S. PATENT DOCUMENTS

| 3,824,674 | 7/1974 | Inoyama et al. | 901/16 |
| 4,609,325 | 9/1986 | Gabrielli | 902/29 |
| 4,673,329 | 6/1987 | Kato | 901/28 |

FOREIGN PATENT DOCUMENTS

| 2556595 | 1/1976 | Fed. Rep. of Germany . |
| 3310191 | 1/1985 | Fed. Rep. of Germany . |

Primary Examiner—James B. Marbert
Attorney, Agent, or Firm—Horst M. Kasper

[57] ABSTRACT

An upper fixed plate (3) can have an annular fixed plate (4) attached, where both are disposed at the lower end of a work arm (1) of an industrial robot. A spring-supported receiver disk (5) with an attachment ring (5a) for a gripper (2) can be supported on the upper fixed plate (3) and on the annular fixed plate (4). The upper fixed plate (3) and the annular fixed plate (4) each can have four engagement-catch recesses for ball-shaped locking elements (6). The engagement-catch recesses can be of conical shape and can have an opening angle of about 120 degrees and can have a depth of about 3 mm. In addition, the upper fixed plate (3) can be provided with two centering bores (3c) for motion-limiting pins (9). The motion-limiting pins (9) protrude into the motion-limiting bores (5c) of the spring-supported receiver disk 5. Next to the motion-limiting bores are disposed threaded bores (5b) with a threaded socket (7) for the ball-shaped locking element (6). The ball-shaped locking element (6) is pressed with a spring (8) into the engagement-catch recess (4b) of the lower annular fixed plate (4). The locking element (6a), illustrated on the right-hand side of the drawing of FIG. 1, is locked in an engagement-catch recess (3b) of the upper fixed plate (3).

21 Claims, 3 Drawing Sheets

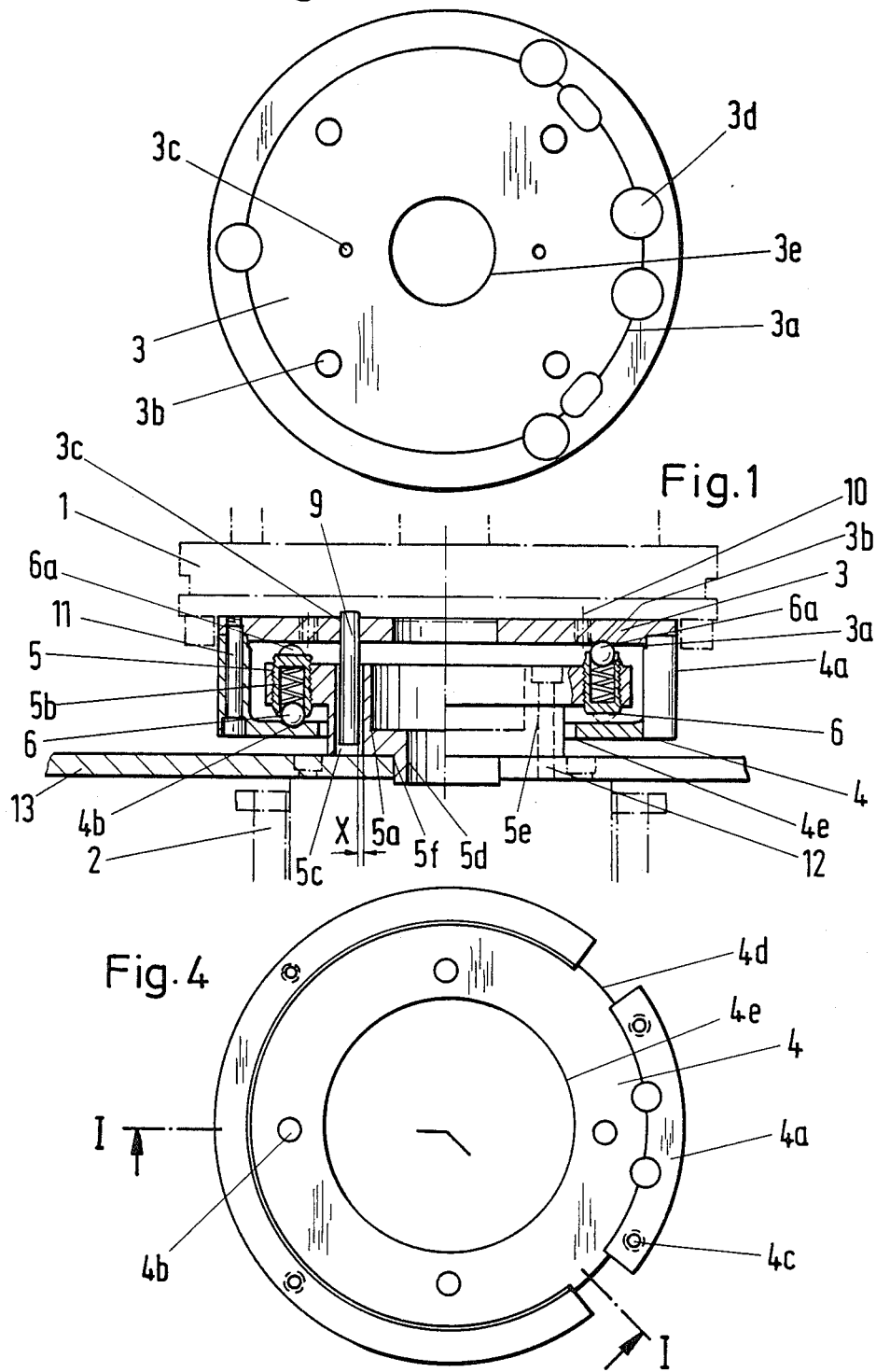

SUPPORT FOR A GRIPPER

BACKGROUND OF THE INVENTION

1. Field of the Invention

The invention relates to a support for a gripper, for a tool, or the like, in connection with an industrial robot, where the industrial robot comprises, at the end of its work arm, two plates maintained at a distance from each other for a receiver disk which is spring-loadingly supported at anti-friction or roller bodies, which is further provided with an attachment ring for the gripper and which protrudes through a plate disposed remotely relative to the work arm.

2. Brief Description of the Background of the Invention Including Prior Art

A support of the kind set forth above is taught in the German Patent No. DE-PS 33 10 191 and it is part of a pneumatic gripper. Even though the support taught in the German Patent No. DE-PS 33 10 191 contains substantial equipment requirements, it does not allow any shifting of the lower part versus the upper part, where such shifting would make a lot of sense for the gripping of many parts.

SUMMARY OF THE INVENTION

1. Purposes of the Invention

It is an object of the invention to provide a support for a gripper, tool, or the like, for an industrial robot, which is constructed in a simpler and more movable fashion.

It is another object of the present invention to provide a support for a gripper which exhibits a spring-resiliency.

It is yet another object of the present invention to provide a support for an industrial gripper which allows for a limited motion and shifting of the gripper versus a gripper arm from a locking position.

These and other objects and advantages of the present invention will become evident from the description

2. Brief Description of the Invention

A support for a gripper of an industrial robot comprises a work arm, an upper fixed plate forming a plate element, and an annular fixed plate forming a plate element. The upper fixed plate and the annular plate are disposed at an end of the work arm of the robot, where the two plates are maintained at a distance from each other and where the upper fixed plate and the annular fixed plate are fixedly connected to one another. A receiver disk, forming a plate element, is disposed between the upper fixed plate and the annular fixed plate. The support also comprises an anti-friction means and a spring-support means with counteracting springs. The receiver disk is spring-supported by the spring-support means at the anti-friction means. The spring-supported receiver disk is supported with locking elements on two sides via said spring-support means. Engagement-catch recesses are disposed on the plate elements. The locking elements are engaged in engagement-catch recesses of an opposing plate element separated by the spring support means.

For the supporting of the gripper, an attachment ring can be provided at the spring-supported receiver disk. Preferably, the gripper protrudes through the annular fixed plate disposed remotely relative to the work arm.

Every second one of the locking elements can lock in engagement-catch recesses disposed in the one upper fixed plate. The remaining locking elements, disposed in between every second one of the locking elements, can engage in engagement-catch recesses disposed in the annular fixed plate.

Threaded bushings, disposed in threaded boreholes, can be provided in the spring-support receiver disk. Three of the locking elements can be disposed on a circular arc in engagement-catch recesses. The spring-support means can be provided by helical compression springs. The locking elements can be disposed with corresponding helical compression springs in the threaded bushings.

Preferably, at least two motion-limiting pins are disposed in motion-limiting bores provided in a receiver disk. The motion-limiting pins can protrude from a respective opposite plate element. The diameter of the motion-limiting bores can be larger by the permissible shifting path X as compared to the diameter of the motion-limiting pins. The shifting path X can be less than the locking path Y of the recess.

Preferably, an outer ring is provided at the annular fixed plate. The outer ring in turn can be provided with boreholes for screws and the annular fixed plate can be attached to the upper fixed plate with said screws. The outer ring can be provided with several edge recesses for a guiding of conduits. The upper fixed plate can be provided with conduit boreholes.

Preferably, an attachment ring, provided the spring-supported receiver disk, is disposed in a central bore the annular fixed plate. The attachment ring can be provided with bores for attachment screws for a manipulation tool attachment plate. The diameter of the central bore can be larger by the size of the shifting path X as compared to the diameter of the attachment ring.

In accordance with the present invention, the plates are solidly connected to each other, and the receiver disk, disposed between these two plates, is supported with locking elements via oppositely acting springs, where the locking elements engage in engagement-catch recesses of the plates or of the receiver disk. Based on the spring-supported bearing of the receiver disk, the receiver disk can be shifted in axial direction relative to the plates against the force of the springs. Thereby, in addition, canting of the receiver disk provided with an attachment ring is possible in case of different compression degrees of the springs.

The locking positions and the load elements are preferably positioned at the side of the support which carries the load. Frequently, a smaller number of locking elements is required on the opposite side. In addition, every second one of the locking elements can lock in engagement-catch recesses of the upper plate and the locking elements, disposed in between, can engage in engagementcatch recesses of the annular plate. Thereby, the receiver disk is movable in the two axial directions opposite to the force of the springs and the receiver disk can furthermore escape laterally or can be rotated upon a rolling of the locking elements on the engagement-catch recesses. The locking elements are preferably disposed in threaded screw bushings or threaded sockets with their springs, where the threaded sockets are disposed in threaded bores of the spring-supported receiver disk. These locking elements can be produced economically in a production line and they can be pretensioned with the threaded sockets in the threaded bores as desired.

In order to limit the radial or lateral motion, at least two motion-limiting pins protrude from one of the plates into bores of the spring-supported receiver disk, where the diameter of the bores of the spring-supported receiver disk is larger by permissible shifting path as compared to the diameter of the pins. The shifting path itself is smaller than the maximum locking path of the recess which, in practical context, can be from about 1 to 5 mm, and preferably from about 2 to 3 mm, and which therefore is disposed in such a region that the control of the work arm of the industrial robot does not require any extraordinary requirements to precision production.

According to a further feature of the invention, the annular plate is provided with an outer ring with boreholes for screws, by way of which the annular plate can be attached to the upper plate. According to a further embodiment of the invention, the annular plate is provided with an outer ring with boreholes for screws, by way of which it is attached to the other plate. The outer ring is provided with one or a plurality of edge recesses for feeding through of lines, for which the plate is provided with lead-in lines. In order to apply a gripper connection plate, the spring-supported receiver plate protrudes with a connection ring through a central bore of the annular plate.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 1 is a substantially cross-sectional view through a support according to the present invention, substantially along the section lines I—I of FIGS. 3 and 4, FIG. 2 is a bottom plan view on the upper plate, FIG. 4 is a top plan view onto the annular plate.

DESCRIPTION OF INVENTION AND PREFERRED EMBODIMENT

Figure 5:
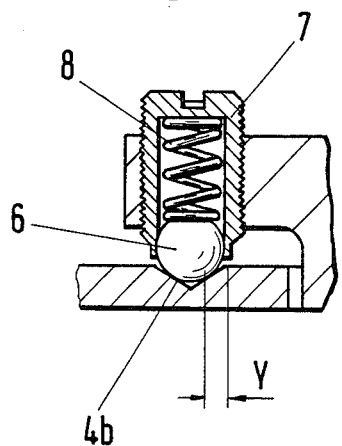
FIG. 5 is a substantially sectional view of the engagement-catch recess with a locking element disposed therein according to the embodiment of FIG. 1 at an enlarged scale.

Referring now to FIG. 1, there is attached an upper fixed plate 3 with an annular fixed plate 4 at the lower end of a work arm 1 of an industrial robot. A spring-supported receiver disk 5 with an attachment ring 5a for a gripper 2 is supported at the upper fixed plate 3 with the annular fixed plate 4. The upper fixed plate 3 is provided at its lower side with a centering edge 3a for an outer ring 4a of the fixed annular plate 4 and, in addition, there are provided on a circular arc four engagement catch recesses 3b for ball-shaped locking elements 6. The engagement-catch recesses are conical and have an opening angle of from about 100 to 150 degrees, and preferably from about 110 to 130 degrees, such as 120 degrees, and they can be from about 1 to 10 mm deep, and they are preferably from about 2 to 4 mm, such as 3 mm, deep. In addition, the upper fixed plate 3 is provided with two centering bores 3c for motion-limiting pins 9, which protrude into motion-limiting bores 5c of the spring-supported receiver disk 5, as can be recognized in the left-hand side of FIG. 1. One of the threaded boreholes 5b with a threaded bushing 7 for the ball-shaped locking element 6 is disposed next to the motion-limiting bores 5c. The locking element is pressed by a spring 8 into the engagement-catch recess 4b of the lower annular fixed plate 4. The locking element 6a, illustrated in FIG. 1 on the right-hand side, is locked in a locking recess 3b of the upper fixed plate 3.

Figure 3:
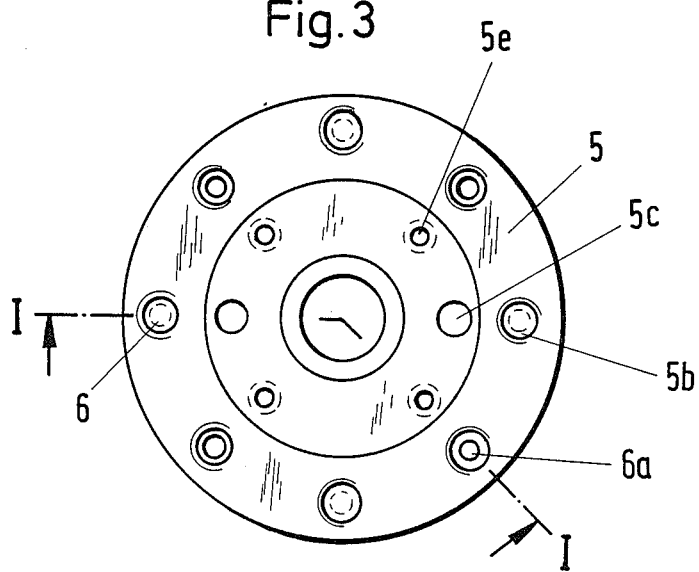
FIG. 3 is a top plan view onto the springsupported receiver disk.

Eight threaded bores 5b for the threaded bushings 7 can be recognized on a circular arc in FIG. 3. The locking elements 6a, illustrated by a solid line, engage in the four engagement-catch recesses 3b of the upper fixed plate 3. The locking elements 6, illustrated by a dotted line, lock in the four engagement-catch recesses 4b of the annular fixed plate 4, as can be recognized in FIG. 4. In addition, FIG. 3 illustrates the two motion-limiting boreholes 5c for the two motion-limiting pins 9, as well as four bores 5e for the screws 12, which carry a gripper connection plate 13, where the gripper 2 is disposed below the gripper connection plate. The spring-supported receiver disk 5 is provided with an attachment ring 5a with a staggered connection guide 5f for the gripper connection plate 13, as can be recognized in FIG. 1. In addition, the possible shifting path X for the possible motion of the spring-supported receiver disk 5 versus the upper fixed plate 3 is illustrated in FIG. 1. This shifting path X amounts, for example, to about 2.5 to 3 mm, while the locking path Y (FIG. 5) of the locking element 6 on the inclined section of the engagement-catch recess 4b amounts, for example, to about 3 mm. This engagement-catch recess is illustrated in FIG. 5 in an enlarged scale.

In addition, the attachment of the annular fixed plate 4, by way of screws 11 to the upper fixed plate 3, can be recognized in FIG. 1. The upper fixed plate 3 is provided with a central bore 3e and with two conduit boreholes 3d for hydraulic or electric conduits. Edge recesses 4d are provided for the guiding of the hydraulic or electric conduits in the outer ring 4a of the annular fixed plate 4. The central bore 4e of the annular fixed plate 4 is provided with larger dimensions than the attachment ring 5a of the spring-supported receiver disk 5 for allowing the motion of the spring-supported receiver disk 5.

Figure 6:
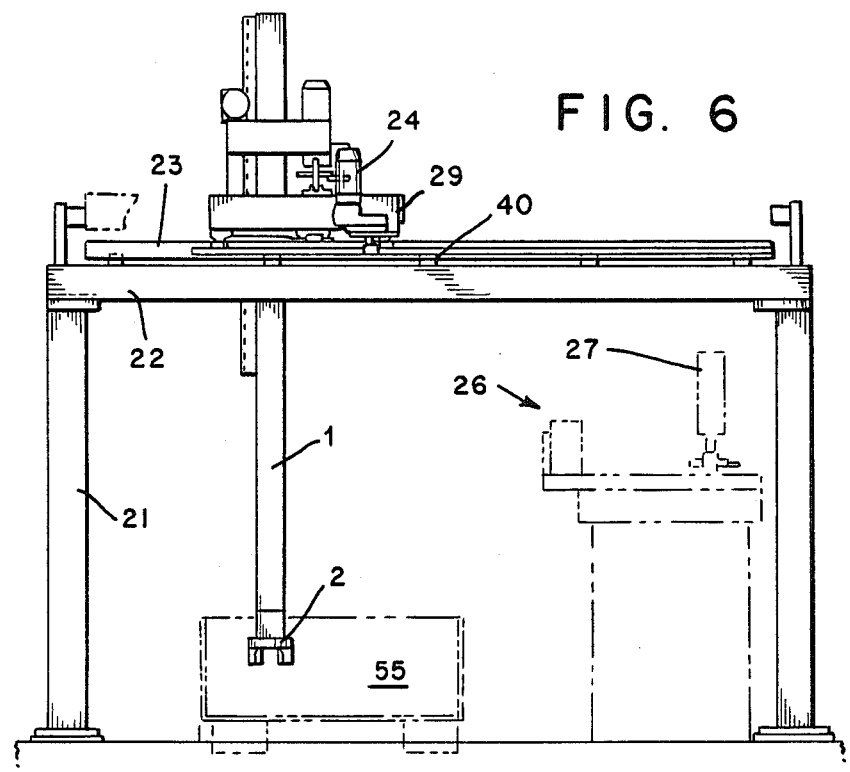
FIG. 6 is a side elevational view of an embodiment illustrating the positioning of the gripper.

Referring now to FIG. 6, there is shown a side view of a robot system. There is shown a working area 55 in the area of which the gripper 2 operates. The gripper 2 is mounted to the robot arm 1 which, in turn, is mounted to a robot carriage 29, which is driven by an electric motor 24 (FIG. 6). The carriage can move along a support piece 23 which is disposed slightly above rails 22. The rails 22 are supported by legs 21. A control system 26 is provided for operating the robot. A display screen 27 allows the viewing of the monitoring data relating to the operation of the robot and data input for controlling the robot.

Figure 7:
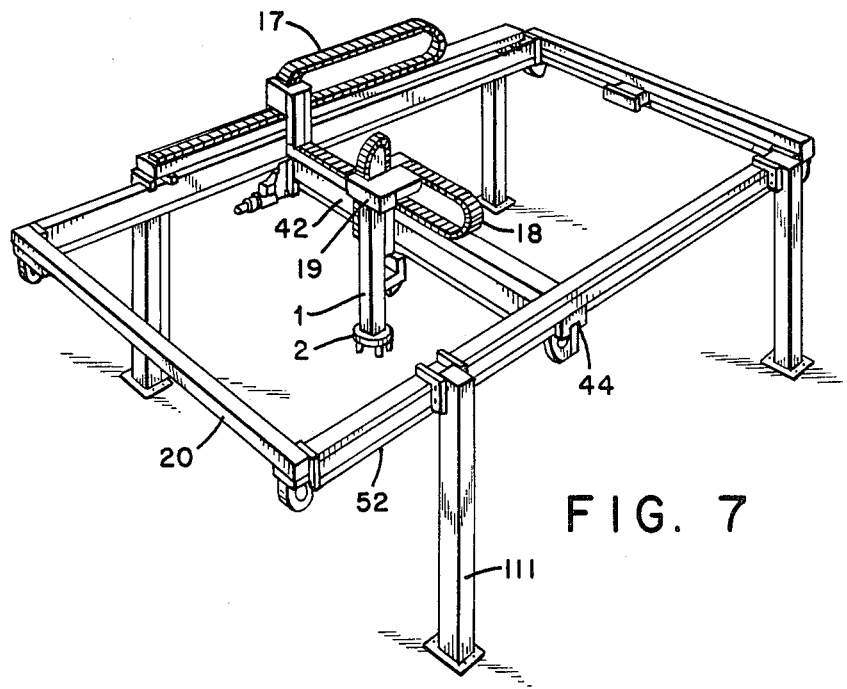
FIG. 7 is a perspective view of another system employing the support or gripper according to the invention.

Referring now to FIG. 7, there is shown a system in a perspective view employing the gripper according to the invention. Two parallel rails 52 are supported by stands 111. A roller carriage 44, movably mounted to the rail 52, carries a cross rail 42. The cross rail 42 is supplied with electrical power by a flexible electrical connection conduit 17. The cross rail 42 in turn carries a carriage 19 which includes a motor. This motor is connected to the power provided to the cross rail via a flexible electrical connection conduit 18. The carriage 19 has attached an arm 1 to which the gripper 2 is mounted. End rails 20 are provided to limit the motion of the cross rail 42 along the rail 52.

Preferably, the inner diameter of the threaded sockets 7 can be from about 0.05 to 0.1 of the diameter of the spring-supported receiver disk 5. The diameter of the spring-supported receiver disk 5 can be from about 0.8 to 0.9 of the diameter of the upper fixed plate 3. The diameter of the engagement-catch recess 4b can be from about 0.8 to 1.5 of the inner diameter of the threaded socket 7. The axes of the threaded sockets 7 can be disposed on a centered circular line of the spring-supported receiver disk 5 having a diameter of from about 0.7 to 0.9 of the diameter of the spring-supported receiver disk 5 and preferably of from about 0.75 to 0.85 of the diameter of the spring-supported receiver disk 5. The number of locking elements on the circular line can be from about four to ten and is preferably between six and eight. The diameter of the bores for the motion-limiting pins can be from about 0.8 to 1.5 the inner diameter of the threaded sockets 7. The diameter of the motion-limiting pins can be from about 0.5 to 0.9 of the diameter of the boreholes for the motion-limiting pins. The length of the motion limiting pins can be from about 0.2 to 0.4 of the diameter of the upper fixed plate 3. The diameter of the locking elements 6 can be from about 0.9 times the inner diameter of the threaded sockets 7 and preferably to about 1.0 of the inner diameter of the threaded sockets 7. The spring elements 8 are preferably compression springs which are disposed in the threaded sockets 7 and which are made from spring bronze. The center of the screws 11 is preferably disposed outside of a circular line of a diameter of 0.8 times the annular fixed plate 4 diameter and preferably outside of a ring of 0.9 times the annular fixed plate 4 diameter. Preferably, the engagement-catch recesses are disposed with those on the upper fixed plate 3 staggerred relative to those on the annular fixed plate 4. The diameter of the central base of the annular fixed plate 4 is preferably from about 0.3 to 0.7 of the outer diameter of the annular fixed plate 4 and preferably from about 0.4 to 0.6 of the outer diameter of the annular fixed plate 4. The diameter of a the central bore 4 of the upper fixed plate 3 can be from about 0.2 to 0.3 of the diameter of the upper fixed plate 3. The outer distance of the annular fixed plate 4 from the upper fixed plate 3 can be from about 0.2 to 0.3 times the diameter of the upper fixed plate 3. The thickness of the spring-supported receiver disk 5 can be from about 0.25 to 0.5 times the outer distance of the upper fixed plate 3 from the annular fixed plate 4. The motion-limiting pins 9 are preferably disposed in an area which projects into the central bore 4e of the annular fixed plate 4. The compression springs 8 are dimensioned such that a force corresponding to about from 1 to 3 times the weight of the attached gripper is required for displacing the locking element 6 from its locking position. The length of the helical compression springs in a locking position can be from about 0.25 to 0.5 times the outer distance of the upper fixed plate 3 from the annular fixed plate 4. The available lateral path of motion can be from about 0.3 to 0.8 times the diameter of the engagement of the ball-shaped locking element 6 and preferably is from about 0.4 to 0.5 times the diameter of the ball-shaped locking element 6. The depth of the engagement-catch recesses can be from about 0.4 to 0.6 of the thickness of a respective upper fixed plate 3 or of a respective annular fixed plate 4.

It will be understood that each of the elements described above, or two or more together, may also find a useful application in other types of supports for a gripper differing from the types described above.

While the invention has been illustrated and described as embodied in the context of a support for a gripper in connection with an industrial robot, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A support for a manipulation tool of an industrial robot comprising
    a work arm;
    an upper fixed plate forming a plate element;
    an annular fixed plate forming a plate element, where the upper fixed plate and the annular plate are disposed at an end of the work arm of the robot, where the two plates are maintained at a distance from each other and where the upper fixed plate and the annular fixed plate are fixedly connected to one another;
    a receiver disk forming a plate element, which receiver disk is disposed between the upper fixed plate and the annular fixed plate;
    anti-friction means for contacting spring-support means with counter-acting springs, where the receiver disk is spring-supported by the spring-support means at the anti-friction means;
    locking elements where the spring-supported receiver disk is supported with locking elements on two sides via said spring-support means;
    engagement-catch recesses disposed on the plate elements, wherein the locking elements are engaged in engagement-catch recesses of an opposing plate element separated by the spring support means.

2. The support for a manipulation tool of an industrial robot according to claim 1 further comprising
    a manipulation tool;
    attachment ring provided at the spring-supported receiver disk for supporting the manipulation tool, and wherein the manipulation tool protrudes through the annular fixed plate disposed remote relative to the work arm.

3. The support for a manipulation tool of an industrial robot according to claim 1 wherein
    every second one of the locking elements lock in engagement-catch recesses disposed at the one upper fixed plate, and where the remaining locking elements disposed in between every second one of the locking elements engage in engagement-catch recesses disposed at the annular fixed plate.

4. The support for a manipulation tool of an industrial robot according to claim 3, further comprising threaded bushings disposed in threaded boreholes provided in the spring-support receiver disk;
   wherein three of the locking elements are disposed on a circular arc in engagement-catch recesses;
   wherein the spring-support means are provided by helical compression springs;
   wherein the locking elements are disposed with corresponding helical compression springs in the threaded bushings.

5. The support for a manipulation tool of an industrial robot according to claim 1, further comprising at least two motion-limiting pins disposed in motion-limiting bores provided in a plate element, where the motion-limiting pins protrude from a respective opposite plate element, and wherein the diameter of the motion-limiting bores is larger by the permissible shifting path X as compared to the diameter of the motion-limiting pins.

6. The support for a manipulation tool of an industrial robot according to claim 5, wherein
   the shifting path X is less than the locking path Y of the recess.

7. The support for a manipulation tool of an industrial robot according to claim 1, further comprising an outer ring provided at the annular fixed plate, which outer ring in turn is provided with boreholes for screws, and where the annular fixed plate is attached to the upper fixed plate with said screws.

8. The support for a manipulation tool of an industrial robot according to claim 7, wherein the outer ring is provided with several edge recesses for a guiding of conduits.

9. The support for a manipulation tool of an industrial robot according to claim 1, wherein the upper fixed plate is provided with conduit boreholes.

10. The support for a manipulation tool of an industrial robot according to claim 1, further comprising
   an attachment ring provided at the spring-supported receiver disk via a central bore disposed in the annular fixed plate,
   where the attachment ring is provided with bores for attachment screws for a manipulation tool attachment plate and wherein the diameter of the central bore is larger by the size of the shifting path X as compared to the diameter of the attachment ring.

11. Support for a gripper, tool, or the like, in connection with an industrial robot, where the industrial robot comprises
   two plates at the end of the work arm of the robot, where the two plates are maintained at a distance from each other for a receiver disk which is spring-loadingly supported at anti-friction where the spring-supported receiver disk is provided with an attachment ring for the gripper and wherein the gripper protrudes through a plate disposed remote relative to the work arm, wherein the plates (3, 4) are fixedly connected to one another,
   wherein the spring-supported receiver disk (5) is supported with locking elements (6) on both sides via counter-acting springs (8),
   wherein the locking elements (6) are engaged in engagementcatch recesses (3b, 4b) of the plates (3, 4), or of the spring-supported receiver disk (5).

12. Support according to claim 11, wherein every second one of the locking elements (6a) can lock in engagement-catch recesses (3b) of the one upper fixed plate (3) and where the locking elements (6), disposed in between, and can engage in engagement-catch recesses (4b) of the other annular fixed plate (4).

13. Support according to claim 12, wherein in each case, at least three of the locking elements (6, 6a) are disposed on a circular arc in engagement-catch recesses (3b, 4b).

14. Support according to claim 13, wherein
   the locking elements (6, 6a) are disposed with their springs (8) in threaded bushings (7), and wherein
   the threaded bushings (7) are disposed in threaded boreholes (5b) of the spring-support receiver disk (5).

15. Support according to claim 11, wherein at least two motion-limiting pins (9) in motion-limiting bores (5c) of the spring-supported receiver disk (5) protrude from the plates (3, 4), and wherein
   the diameter of the motion-limiting bores (5c) is larger by the permissible shifting path X as compared to the diameter of the motion-limiting pins (9).

16. Support according to claim 15, wherein the shifting path X is identical, respectively smaller, than the locking path Y of the recess.

17. Support according to claim 11, wherein the annular fixed plate (4) is provided with an outer ring (4a), which outer ring in turn is provided with boreholes (4c) for screws (11), and where the annular fixed plate (4) is attached to the upper fixed plate (3) with the screws (11).

18. Support according to claim 17, wherein the outer ring (4a) is provided with several edge recesses (4d) for the guiding of conduits.

19. Support according to claim 11, wherein the upper fixed plate (3) is provided with conduit boreholes (3d).

20. Support according to claim 11, wherein the spring-supported receiver disk (5) is provided with an attachment ring (5a) via a central bore (4e) of the annular fixed plate (4), which attachment ring (5a) is provided with bores (5e) for attachment screws (12) for a gripper attachment plate (13), and wherein
   the diameter of the central bore (4e) is larger by the shifting path X as compared to the diameter of the attachment ring (5a).

21. A support for a manipulation tool of an industrial robot comprising
   a work arm;
   an upper fixed plate forming a plate element;
   an annular fixed plate forming a plate element, where the upper fixed plate and the annular plate are disposed at an end of the work arm of the robot, where the two plates are maintained at a distance from each other and where the upper fixed plate and the annular fixed plate are fixedly connected to one another;
   a receiver disk forming a plate element, which receiver disk is disposed between the upper fixed plate and the annular fixed plate;
   anti-friction means;
   spring-support means with counter-acting springs, where the receiver disk is spring-supported by the spring-support means at the anti-friction means;
   locking elements where the spring-supported receiver disk is supported with locking elements on two sides via said spring- support means;
   engagement-catch recesses disposed on the plate elements, wherein the locking elements are engaged in engagement-catch recesses of an opposing plate element separated by the spring support means;
   at least two motion-limiting pins disposed in motionlimiting bores provided in a plate element, where the motion-limiting pins protrude from a respective opposite plate element,
   wherein the shifting path X is less than the locking path Y of the recess.

* * * * *